(12) United States Patent
Rochet

(10) Patent No.: US 9,292,805 B2
(45) Date of Patent: Mar. 22, 2016

(54) HUMAN SECURITY AND SURVIVAL SYSTEM

(75) Inventor: Jean-Luc Rochet, Walhain-Saint-Paul (BE)

(73) Assignee: Jean-Luc Rochet, Walhain-Saint-Paul (BE)

( * ) Notice: Subject to any disclaimer, the term of this patent is extended or adjusted under 35 U.S.C. 154(b) by 0 days.

(21) Appl. No.: 13/500,317

(22) PCT Filed: Oct. 6, 2009

(86) PCT No.: PCT/EP2009/007166
§ 371 (c)(1),
(2), (4) Date: Apr. 5, 2012

(87) PCT Pub. No.: WO2011/042033
PCT Pub. Date: Apr. 14, 2011

(65) Prior Publication Data
US 2012/0202471 A1  Aug. 9, 2012

(51) Int. Cl.
*H04M 3/42* (2006.01)
*G06Q 10/00* (2012.01)
*G06Q 50/10* (2012.01)

(52) U.S. Cl.
CPC ............... *G06Q 10/00* (2013.01); *G06Q 50/10* (2013.01)

(58) Field of Classification Search
CPC ........... H04W 4/02; H04W 4/22; H04W 4/20; H04W 76/007; H04W 4/021; G06Q 10/00; G06Q 50/10; H04L 12/1895; G08B 25/14; G08B 27/00
USPC ...................... 455/414.1, 404.1, 404.2, 414.2; 340/506, 573.1
See application file for complete search history.

(56) References Cited

U.S. PATENT DOCUMENTS

| | | | | |
|---|---|---|---|---|
| 6,772,213 B2* | 8/2004 | Glorikian | ....................... | 709/228 |
| 6,914,525 B2* | 7/2005 | Rao et al. | ....................... | 340/531 |
| 7,123,926 B2* | 10/2006 | Himmelstein | ............. | 455/456.1 |
| 8,224,284 B2* | 7/2012 | Foladare et al. | ........... | 455/404.1 |
| 8,462,920 B2* | 6/2013 | Gonen et al. | ................ | 379/93.12 |
| 2002/0075155 A1* | 6/2002 | Guillory | ....................... | 340/601 |
| 2004/0103158 A1* | 5/2004 | Vella et al. | ..................... | 709/206 |

(Continued)

FOREIGN PATENT DOCUMENTS

| JP | 2003234840 | 8/2003 |
|---|---|---|
| JP | 2003281177 | 10/2003 |

(Continued)

OTHER PUBLICATIONS

PCT International Search Report and Written Opinion; Mailed Jun. 1, 2010 for the corresponding PCT Application No. PCT/EP2009/007166.

(Continued)

*Primary Examiner* — Mong-Thuy Tran
(74) *Attorney, Agent, or Firm* — Mendelsohn Dunleavy, P.C.; Steve Mendelsohn

(57) ABSTRACT

The invention relates to a method and system of filling and maintaining a database containing geo-localized user data comprising the following steps: —receiving registration data from users, —generating a personalized user-environment like a dynamically generated personal WebPage; —requesting and storing of HSS-data of the registered user by means of the personal WebPage using the Internet; —maintaining the database by checking the HSS-data each time the user makes direct or indirect contact with the personal WebPage.

7 Claims, 3 Drawing Sheets

(56) References Cited

U.S. PATENT DOCUMENTS

| | | | |
|---|---|---|---|
| 2005/0030977 A1* | 2/2005 | Casey et al. | 370/485 |
| 2005/0197775 A1* | 9/2005 | Smith | 702/3 |
| 2005/0288035 A1* | 12/2005 | Wang | 455/456.1 |
| 2007/0159322 A1* | 7/2007 | Garratt Campbell | 340/539.13 |
| 2007/0202927 A1* | 8/2007 | Pfleging et al. | 455/567 |
| 2007/0216535 A1* | 9/2007 | Carrino | 340/573.1 |
| 2007/0268121 A1* | 11/2007 | Vasefi et al. | 340/506 |
| 2007/0296575 A1* | 12/2007 | Eisold et al. | 340/539.16 |
| 2009/0018875 A1* | 1/2009 | Monatesti et al. | 705/7 |
| 2009/0055229 A1* | 2/2009 | Lidgren et al. | 705/7 |
| 2009/0098857 A1* | 4/2009 | De Atley | 455/411 |
| 2009/0138353 A1* | 5/2009 | Mendelson | 705/14 |
| 2009/0254392 A1* | 10/2009 | Zander | 705/7 |
| 2009/0279682 A1* | 11/2009 | Strandell et al. | 379/201.02 |
| 2009/0298461 A1* | 12/2009 | O'Reilly | 455/404.2 |
| 2010/0035574 A1 | 2/2010 | Punz | |
| 2010/0035575 A1* | 2/2010 | Wu | 455/404.1 |
| 2010/0105351 A1* | 4/2010 | Xu et al. | 455/404.1 |
| 2010/0240339 A1* | 9/2010 | Diamond | 455/404.2 |
| 2010/0262668 A1* | 10/2010 | Piett et al. | 709/206 |
| 2011/0045801 A1* | 2/2011 | Parker, II | 455/411 |

FOREIGN PATENT DOCUMENTS

| | | |
|---|---|---|
| JP | 2005182189 | 7/2005 |
| JP | 2009175044 | 8/2009 |
| WO | 02091252 A2 | 11/2002 |
| WO | 2007106541 A2 | 9/2007 |

OTHER PUBLICATIONS

Kasai, K., "Personal Information Access Control Model with Consideration of Context Change," The Institute of Electronics, Information and Communication Engineers, IEICE Technical Report, Japan, Nov. 24, 2008, vol. 108, No. 329, pp. 53-54. English Abstract Only.

* cited by examiner

INDIRECT HSS REGISTRATION TO THE Minfo HSS WEB SITE

HUMAN SECURITY AND SURVIVAL SYSTEM

The invention relates to a method and system for a method of filling and maintaining a database containing geo-localized user data.

From US patent application 2007/0216535 a HSS (Human Security and Survival) method and system is known for immediately alerting users within a targeted geographical area to a crisis, emergency or important event by sending warning information over multiple means of communication. This system broadly includes: (1) an input device including a user registration page prompting users for information, including phone and mobile phone numbers and e-mail addresses; (2) a storage device for storing the user information and for forming a user database; (3) an administrative access device wherein at least one administrative member is capable of accessing the user database; (4) connecting means for integrally connecting the database to a local intranet/internet grid; (5) the input device further including an administrative page that is populated by the administrative member through the entry of alert information; (6) the administrative page further comprising a confirmation page that confirms the warning information to be send; and (7) an output device for sending the important warning information to each of the user over multiple communication means. Preferably, the communication means comprise (i) mobile phone text; (ii) email messages; and (iii) a secure website page updated periodically with alert information.

This method and system has the disadvantage that for maintenance of the database and sending the warning information an administrative member is necessary to activate the warnings and to access the database.

User registration is the key feature that links the ability of the system to provide warnings by collecting sensitive data from users. Users wishing to receive warnings have to proactively register in order to subscribe to the various warnings due to the personalized information that is collected. In order to built, grow and maintain the database users may refer, recruit and inform other users of the utility of and provide information on its worthwhile benefits, thereby encouraging users registration. Within the software there is a user referral registration component that will allow users to invite other users to learn about the service and encourage them to become registered. This method of building and maintaining the database cannot guarantee over a long period—without administrative members—that the user registration database will stay up to date and will be continuously filled with new users.

Therefore there is a need for a method and system of filling and maintaining a database whereby reliably, at low costs, with a minimum chance of failure, the registration data is updated and non-registered users are invited to register and provide HSS-data.

The object of the invention is therefore to provide a method and system whereby continuously users are requested to provide and or update their HSS-data.

This object of the invention is achieved in a method comprising the following steps:
- receiving registration data from users directly through the Internet or indirectly using a method for requesting and subsequently transmitting product data information stored in a database by inputting a product code into a mobile phone, or from the programming interface of a partner like partner websites, government organisations, insurance agencies, mutual companies;
- generating a personalized user-environment like a dynamically generated personal WebPage;
- requesting of HSS-data of the registered user by means of the personal WebPage using the Internet, the HSS-data being chosen from: fixed or mobile phone number, particular geo-locations of interest such as home, work or family and the contact address;
- storing of HSS-data of the user together with its registration data into the database;
- maintaining the database by checking the HSS-data each time the user makes direct or indirect contact with the personal WebPage.

The above mentioned features provide for a method whereby the users regularly are asked to update the HSS date or to register with the warning service and provide registration data with relevant HSS-data.

Several preferred embodiments are described in claims 2-7. By these measures an improved service and maintainability is obtained or the reliability of the database increased; an improved method for generating and dissemination the warnings is obtained.

The invention also relates to a system for generating personalized warnings, as described in claims 8 and 9. This system comprises means for performing the methods according to claims 1-7.

The invention is further explained by means of a drawing of an embodiment of the method and the system, whereby features and other advantages will come forward.

The method of filling and maintaining a database containing geo-localized user data comprising HSS-data is a new technology, a new method allowing the dynamic and indirect construction and filling of a database, the management and maintenance of which can allow the earlier warning of users in case of catastrophes, to increase the efficiency of rescue and, basically, to increase the security and the chances of survival of populations in case of unpredictable events.

A system and method allowing the filling and maintenance of a private database of geo-localized people and their possessions, so that the users can be alerted in the event of a catastrophe. The system can use all current and upcoming means of communication (SMS, MMS, e-mail, mobile phone, fax, etc.) to warn every individual in the danger zone, based on a perimeter of security.

The database functions through voluntary subscriptions or registrations, and agreement to be geo-localized (OPT-IN). Users who wish to use the system must first register in a private database, through the Internet or indirectly using the SMS based communication system Code Selector (patent WO02091252), or from a programming interface of a partner (partner websites, government organs, insurance agencies, mutual company).

This is an inventive novelty concerning the use of the method as described in WO02091252.

Figure 1:
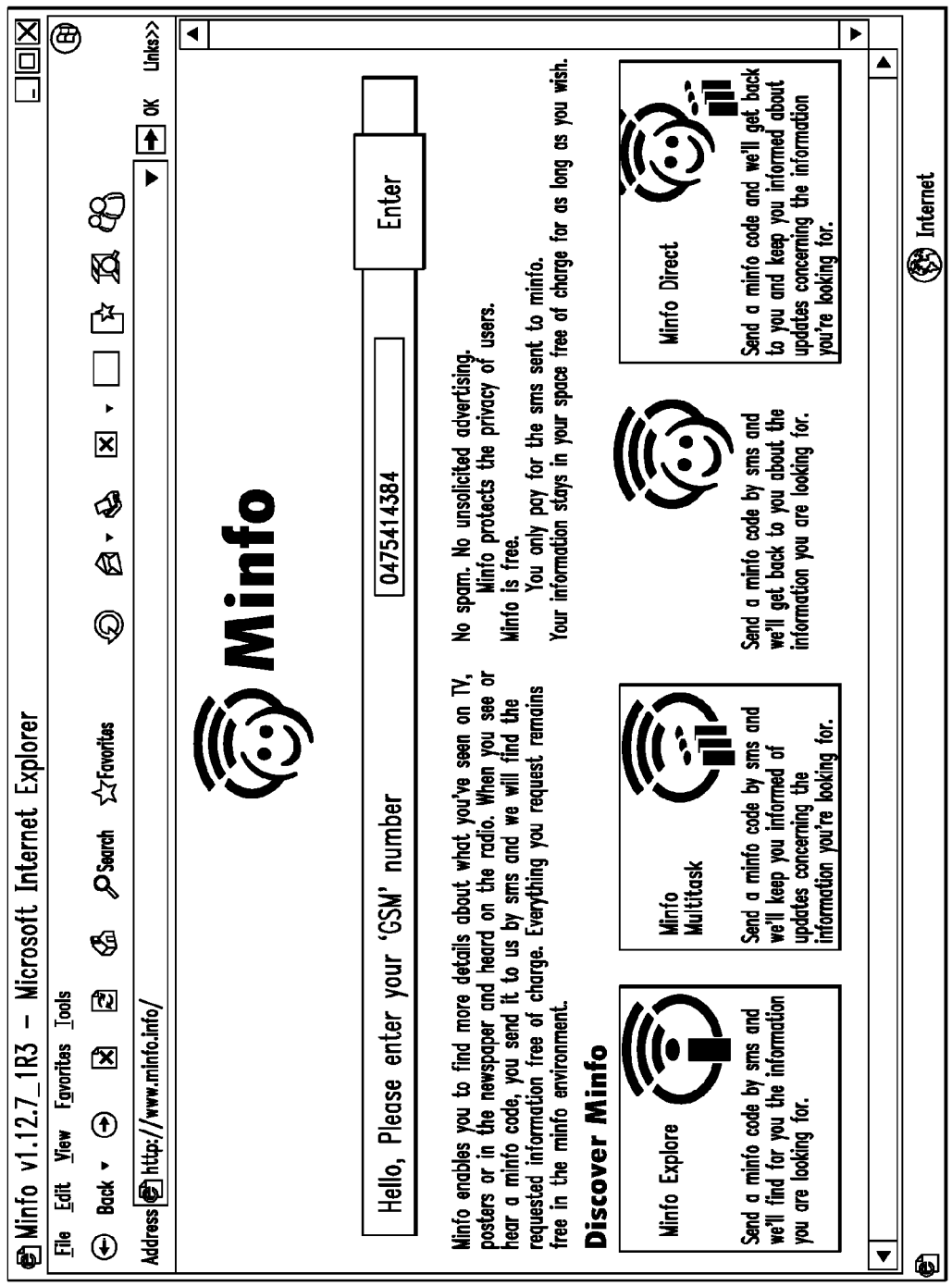
FIG. 1 shows the method of indirect filling the HSS-database according to MInfo-method of WO02091252

On the Internet website MInfo Portal (WO02091252, see FIG. 1), each user, on his personal environment, in a specific HSS zone, indicate his fixed or mobile phone number and the physical and/or contact addresses of property he wishes to protect. The user can also specify the types of alerts/services he wishes to subscribe to, in addition to emergency warnings (i.e., natural catastrophe, fire, accident, etc.). He can also indicate additional personal information, such as a handicap, which could allow us to alert another person or user and/or find out the best way raise the alarms or help the emergency and rescue services.

The system receives the alerts and catastrophe information from competent and authorized services (civil security, rescue squads, state modules, meteorology, . . . ). The risk or event covered by the alert is located through latitude and longitude coordinates, then a security perimeter and danger area zone is determined. After verification and validation, a message specific to the alert is sent through the different means of communication to the people situated in the danger zone (or if they have possessions they wish to protect in said zone). Each person will be able to consult the news and updates specific to his area and determine his best strategy on his HSS environment, accessible through Minfo Portal WO02091252.

In case of an SMS alert, the message is marked by an electronic signature identifying it as an urgent alert. When the mobile phone receives the message, it recognizes the alert and automatically activates the maximum sound level and emits an emergency warning signal.

This manner of constructing and filling the database is the most efficient, because every use of process WO02091252 will allow the possibility of subscribing to HSS, and will allow the maintenance of the HSS database.

1. WO02091252 for the citizen/user:

A new system and method allowing personalized interactions between a distributer, announcer or retailer and a consumer/user using short codes inserted in the traditional media. Sending these short codes by SMS automatically generates a personalized Internet page containing the information relative to a product or service.

The technology works as follows:
An announcer inserts in their media ads (television, radio, newspaper, . . . ) advertisement codes, to be sent by SMS to a short telephone number, in order to obtain information concerning a product or service, or a certain promotion found in the ad;
A person is interested by the ad, and wishes to obtain more information than is simply contained in the advertisement;
This person therefore sends an SMS with the code to a short phone number (ex: SMS Golf to 3665);
This person then receives an SMS himself, containing complementary information, but mainly inviting him to go to the website (Minfo Portal; see FIG.1), to register and subscribe as a user, insert his cell phone number, giving him access to his personal and automatically generated environment, which contains all the information he requires;
Once inside his personal environment, the user has access to all the information he asked for by SMS, and only this information (no SPAM);
This information comes in the form of precise URL links to the pertinent sections of the advertiser's Internet sites and it's specific offers;
The user will then have the possibility of ordering the products online, he can also directly pay for them and ask for them to be delivered to his home, all this from his personal Minfo environment.

Every advertising campaign using the WO02091252 process will allow registering as a user and thus will permit the maintenance of the HSS OPT-IN database.

Every different possibility offered by WO02091252, such as commerce-e-commerce, commerce-e-banking, branding and co-branding, will also allow and facilitate the maintenance of said database.

Figure 2:
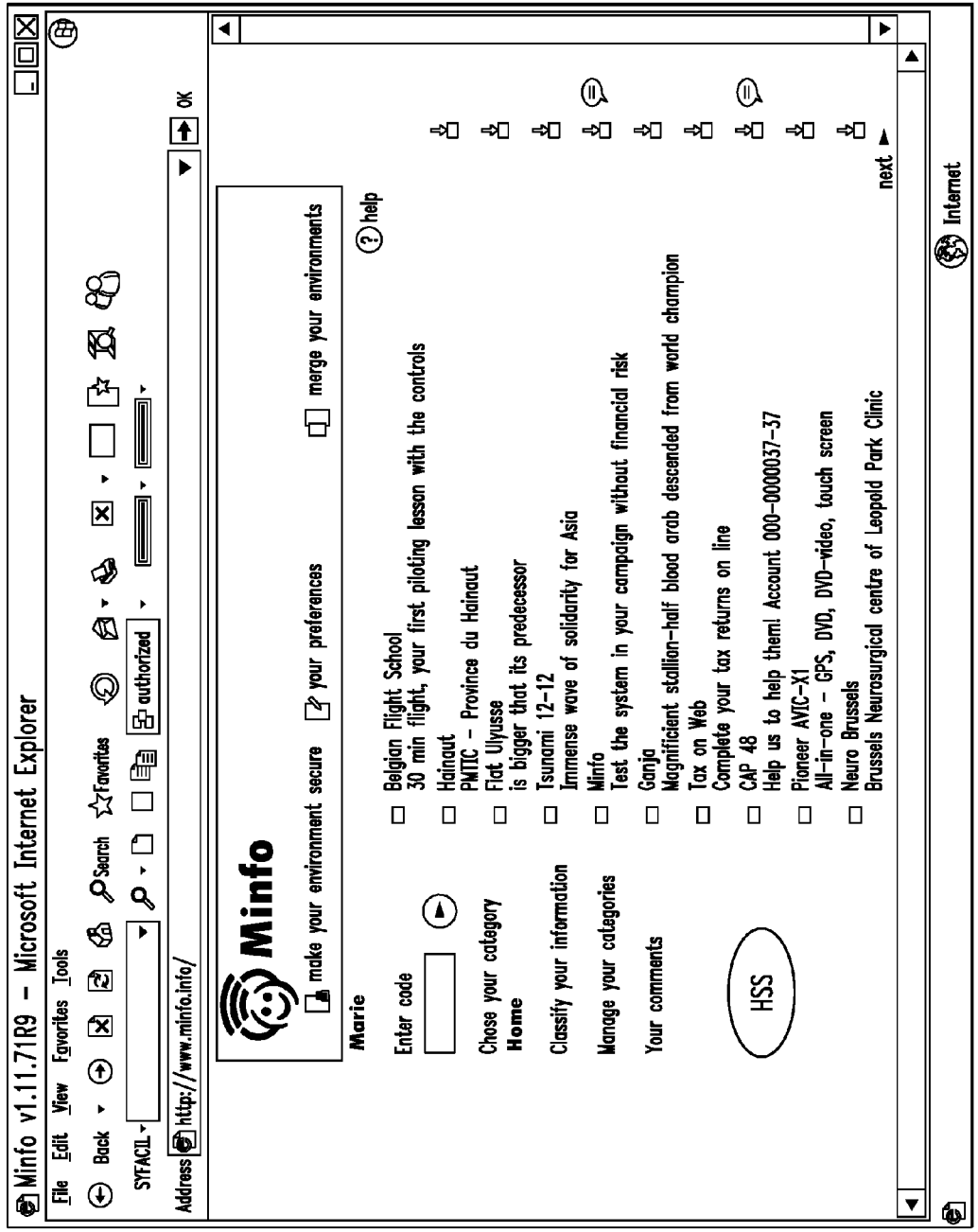
FIG. 2 shows in detail the personalized environment of the Minfo portal including the HSS-registration link and indirect HSS registration to the MInfo HSS Web site.

2. Any user utilizing this system will therefore have the possibility of subscribing to the HSS programme (see FIG. 2: Indirect registration to the HSS Web site). The aim of HSS is to favour the security and chances of survival of people in general in case of natural disasters and catastrophes, whatever they may be (floods, earthquakes, explosions, accidents, epidemics, nuclear, . . . ). To do this, the system must be capable of warning every person in case of events which could endanger their lives, their families or their possessions, to give them an opportunity to save them. This warning should ideally be accompanied by certain types of information, for example the nature of the menace, the closest secure zones, the steps to take to protect themselves, the emergency phone numbers they can call, how much time they have to take the necessary steps, etc. Before this HSS invention, there existed no such system allowing the construction of an evaluative database without requiring important updating efforts from the user.

3. If the government issues the warning on the television or the radio, there is no guarantee that every person in danger will receive the warning. What's more, the government cannot even send SMS messages to everybody because, without authorisation, every SMS is considered as a SPAM, and infringes on the persons' privacy. HSS offers a solution to this problem, by giving the governments (which will be exploiting this system) an indirect system for managing a database to warn every endangered person in case of a disaster, whether the danger is to their safety, their friends or family, or even material possessions which could be saved. It is an indirect system because it will use the technology we've explicated earlier (WO02091252); the fact that commercial means are used to create the database means that a large number of people may be reached.

4. Global Functioning:

4.1 Indirect Subscription Mechanism:

It is obvious that the WO02091252 patent must be accepted to allow the uniqueness of the relationship between the media and the individuals. Indeed, the requested information belongs to the persons/users. The user is represented by his mobile phone number, and must be respected through a process. After requesting information by SMS, the user logs in to his personal Minfo environment, to access the information he ordered, and he will see a HSS link/button, directing him to all the information concerning the system, very visibly appear on the site. He will then have the possibility to subscribe to protection HSS-programmes which interest him with a simple click, and won't have to give any personal information if he doesn't wish to, as we will already have his mobile phone number because of his use of the commercial technology. He will not have to send a new coded SMS either. If he wishes to of course, the user can give complementary information such as his address, that of his family and friends or material goods and property (this has already been covered), to define what he wishes to protect and to be alerted or warned to act preventively or after a sudden unfortunate event.

4.2 By registering, the user accepts only two things: to be geo-localized, and to receive an SMS warning him of the event if it concerns him. He will also have the possibility of choosing different types of services usually offered by the governments (ozone, pollen, snowfalls, etc . . . ).

This is the OPT-IN, and it effectively eliminates the SPAM problematic as the user, by registering, accepts to receive text messages in this case.

4.3 Therefore, a number of mobile phone numbers are obtained, which amount ideally should be as large as possible or even covering the whole of the population, of users who accept to be geo-localized only in case of catastrophe or according to certain specific services they have requested.

Which phone operators are used by users are knows and thus, the system is able to locate them through their mobile phones, to know exactly where they are in the event of a disaster, without having to check their addresses (unless it is specified), all the while respecting their privacy.

In a little while, the geo-localization will be able to be done by the Galileo positioning system. This OPT-IN database would then be used for the services offered by Galileo partners, and a specific interface will be realised.

4.4 use is made of particular information services: that of the state's governments. They have access to all the maps, of populations, safety and emergency modules, danger zones, etc., as well as a direct access to all the forecasts allowing them to anticipate certain dangers. The governments also have ties with the different organisations which will take care of the problem: fire brigades, police, specialized agencies which take care of epidemics or nuclear related problems, etc. Basically, the governments have access to the forecasts, are the first to receive the information in case of a disaster, and are already in contact with the organisations with which they will have to work in case of these events.

4.5 Practically speaking, the government which exploits HSS's system and database will receive information concerning a catastrophe which has just happened, or which probably will. In both cases, it then receives the locations of all the users registered to HSS through the telecoms, and can determine which of these are actually in the danger zone, could enter it soon, or has friends, family or material goods which can be saved in this zone. These users will automatically receive an SMS concerning the event. Every available functionality and means, current and upcoming, will be used to maximize the system's potential; any new technology can easily be incorporated in the HSS system. In a preferred embodiment, a switched off or not activated cell phone recognizes an SMS or other signal as an urgent alert and is configured to be able to be activated or to be switched on and/or configured to be able to emit a signal, as mentioned before, to enhance the reliability of the service.

The SMS will warn them of the impending catastrophe, for example an imminent flood. It will contain the emergency phone numbers the users can call if there is need, as well as an invitation to log on to their personal Minfo HSS environment with all the technologies at his disposition. On this environment, the user will have direct access to all the relevant information which concern him: risks analysis, steps to take to protect themselves from the disaster, the catastrophe's evolution in real-time as well as a forecast of this evolution, important contact numbers, etc. This SMS can also be personalized, for example it can warn a user still working at the office that his son is in a playground which risks to be flooded in one hour, or warn this same user coming home that he is entering a danger zone and telling him to go North, or tell this user that he has about two hours to evacuate his house and move to higher ground, etc.

4.6 In the case of an instantaneous disaster, for example an explosion, or the collapse of a building, the HSS system and the possibility of precise geo-localisation can allow emergency rescue services to be more effective and act more quickly; it allows more lives to be saved, insofar as their mobile phones are still operational.

HSS users not concerned by the catastrophe will be able to participate and help in coordination with rescue services.

The system will continuously measure the impact of the danger/disaster zone (which can always evolve) concerning different areas and layers of population, to allow the rescue services to adapt to the situation and to be the most efficient according to the disaster and the concerned area.

The government module/means will make the decision concerning which users to warn as well as which services to contact according to the evolution of the event, all of this through the HSS system.

4.7 Finally, once the disaster is over, a message can be sent to HSS-users which were not affected by the catastrophe to inform them of it, and to give them the opportunity to donate online to help with the reconstruction of the stricken areas. These donations will be made through the Minfo HSS Portal, which thus becomes a normalized interface containing everything concerning possible reactions to catastrophes. The user will also be informed of the progress of the reconstruction, to assure him that his donations are being put to good use.

Figure 3:
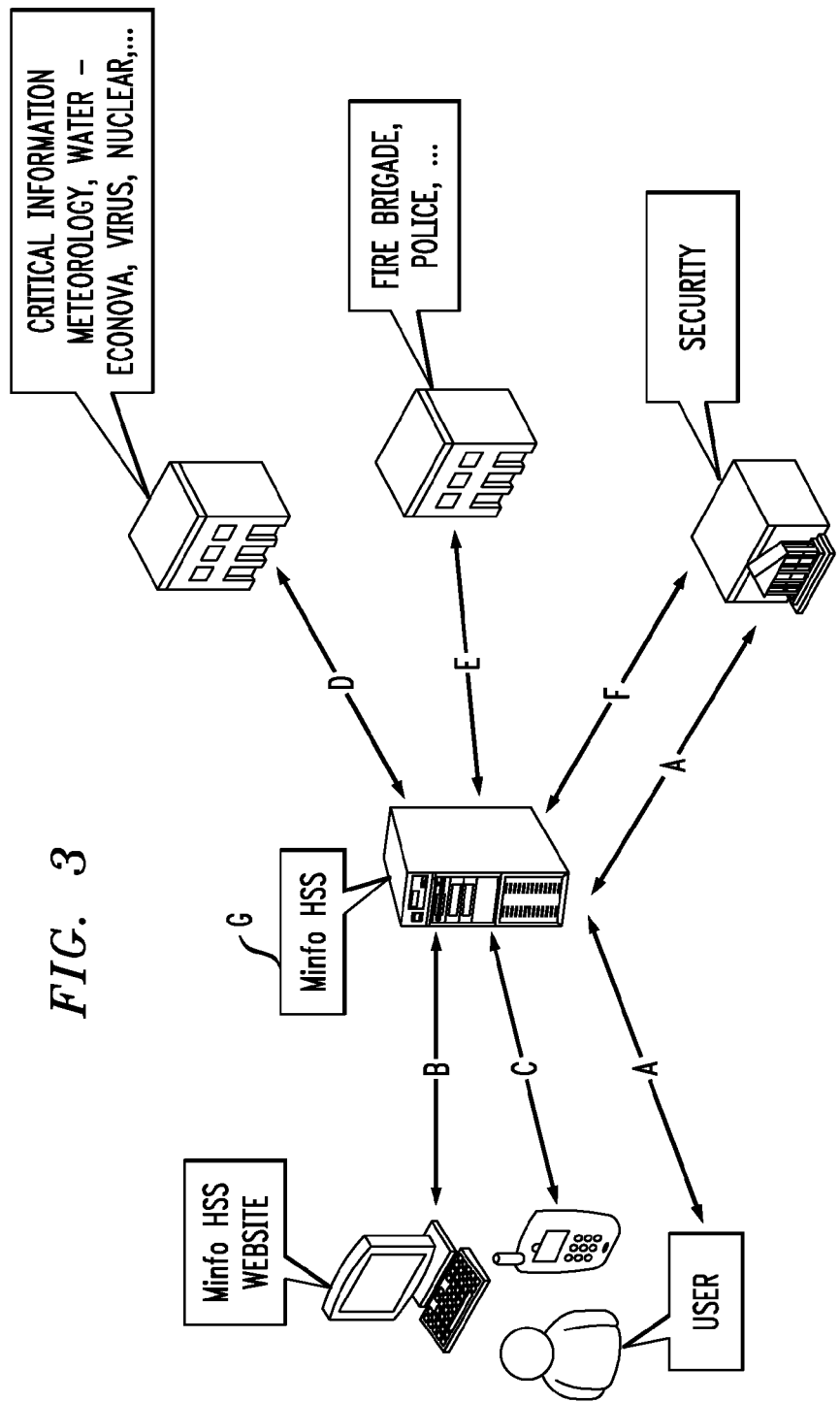
FIG. 3 shows schematically the system capable of performing the methods according to the invention.

5. Schematics: see FIG. 3. A government using the Minfo HSS system (G) is therefore directly in contact with every important actor in case of catastrophe, allowing quick reactions as well as an immediate warning for every registered user. In FIG. 3 is shown security (F); Fire brigade, police (E); critical metrological information—water ECONOVA virus, nuclear etc. (D); MInfo Website (B); User (A) and mobile phone (C).

6. The Minfo HSS system will be open to different warning services and will offer a standardized communication protocol for the acquisition of alert/warning zones and predictions.

7. The security module/means, or government module/means will make the decisions to warn the rescue services and the users, and will generate the precise messages to the OPT-IN users in the danger zones. The system will manage the entries and exits of users in these zones, to alert, warn and reassure them.

8. Summary of the advantages of the method and the system of the invention:

8.1 Advantages For the Users:

users immediately receive a warning in case of an event which endangers them, their family and close relations or their material possessions, and thus they have more time to bring them to safety;

the technology is accessible to all mobile phone users (every mobile phone has the capacity to receive SMS messages), and can easily incorporate any new mobile technology or communication channel;

users have access to a unique source (Minfo HSS Portal) for every information related to the catastrophe, it's nature, it's evolution, as well as information concerning emergency rescue contacts;

the method according to the invention is an easy way to find out how to act in case of a catastrophe, and the information is given by a reliable and legitimate source;

the method is an easy way to have access to information concerning the steps to take, how to react in case of a catastrophe (through the Minfo HSS Portal);

the access to the service is very simple, thanks to the Minfo functionality (WO02091252), and the governments will see that every information concerning HSS, it's objectives and advantages is available ; then, through the Minfo channel, the user can sent a form of feedback concerning the quality of the service;

a concerned user can easily donate to help reconstruct the stricken zones, and has a direct access to the progress of the reconstructions, to insure that his donations are being put to good use; all this is possible through the Minfo HSS Portal system.

8.2 Advantages for the Governments:

the method is a fast way to inform people of a danger, thanks to the evaluative database and the possibility of geo-localisation;

the method is an easy and secure way to offer these people a complete information through different communication channels: SMS, telephone, web, . . . ;

the method allows the government to tell users about the best way to react before, during, and after a catastrophe;

the method is an easy way to give users the possibility of donating, in an effective, sure and legitimate way;

the method respects people's privacy thanks to the HSS functionality on Minfo Portal—users have chosen to subscribe and can therefore be sent SMS only in case of a catastrophe, or if the user specifically has chosen a certain service;

secure and stable infrastructure and access to a normalized platform;

allows a better management of emergency call centres;

the HSS system and method can be incorporated in any advertising communication, and so every user connecting to his personal Minfo environment will have the possibility of easily connecting themselves to the Minfo HSS site—a large number of people are reached;

the government receives a feedback from the users concerning the quality of the service, and can therefore eventually improve it;

the cost is tied to the use of the system and, if enough people have subscribed, this system allows a centralisation which can reduce the budget necessary for the safety and security of the population, while increasing efficiency;

possibility of locating missing users after an instantaneous disaster, to save them more rapidly;

the government can also use Minfo to provide E-Government services.

The invention claimed is:

1. A method of providing emergency warnings to a user, the method comprising:
   (a) filling and maintaining a database of user data by:
      (a1) receiving registration data from a user by transmitting product data information to the user following a request therefor from the user in the form of a product code sent by Short Message Service (SMS) from the user's mobile phone, wherein users are identified in the database by their mobile phone numbers derived from their respective SMSs;
      (a2) generating a personalized user-environment comprising a dynamically generated personal WebPage;
      (a3) requesting Human Security and Survival (HSS)-data of the user using the Internet, the HSS-data comprising one or more of the user's mobile phone number, geo-location of the user's home, geo-location of the user's work, geo-location of the user's family, and the user's contact address;
      (a4) storing of the HSS-data of the user together with the registration data into the database; and
      (a5) maintaining the database by checking the HSS-data each time the user makes contact with the personal WebPage; and
   (b) selectively sending an emergency warning to the user by:
      (b1) receiving catastrophe information including (i) geographic location affected by the catastrophe and (ii) information about the catastrophe;
      (b2) accessing the database to identify the user as being geo-located within the geographic location affected by the catastrophe based on the user's mobile phone number stored in the database; and
      (b3) sending a warning based on the information about the catastrophe to the user's mobile phone, wherein:
         the HSS-data includes information enabling the user to be contacted via one or more types of communication; and
         step (b3) comprises providing the warning using the one or more types of communication comprising one or more of SMS, Multimedia Messaging Service (MMS), mobile phone, fax, WebTV, and Hypertext Transport Protocol (HTTP).

2. The method according to claim 1, wherein the HSS-data further comprises one or more of (i) HSS-services requested by the user, (ii) the user's handicap, and (iii) persons related to the user.

3. The method according to claim 2, wherein the HSS-services requested by the user comprise one or more of natural catastrophe warnings, accident warnings, and personal environmental warnings.

4. The method according to claim 1, wherein the warning is also provided to persons having their contact data stored in the HSS-data of the user.

5. The method according to claim 1, further comprising presenting to the user via the personal WebPage a button to click to give the user's consent to be geo-located and to be sent the warning.

6. The method according to claim 1, wherein the geo-locating is via the user's mobile phone.

7. The method according to claim 1, wherein the geo-locating is done by the Galileo positioning system.

* * * * *